United States Patent
Airoldi et al.

(10) Patent No.: US 10,415,549 B2
(45) Date of Patent: Sep. 17, 2019

(54) WIND TURBINE WITH A BRAKE DUST COLLECTOR

(71) Applicant: Siemens Gamesa Renewable Energy A/S, Brande (DK)

(72) Inventors: Giovanni Airoldi, Aarhus (DK); Kim Granly Hansen, Fredericia (DK); Peter Hessellund Soerensen, Brædstrup (DK)

(73) Assignee: SIEMENS GAMESA RENEWABLE ENERGY A.S (DK)

( * ) Notice: Subject to any disclaimer, the term of this patent is extended or adjusted under 35 U.S.C. 154(b) by 402 days.

(21) Appl. No.: 15/237,670

(22) Filed: Aug. 16, 2016

(65) Prior Publication Data

US 2017/0074251 A1    Mar. 16, 2017

(30) Foreign Application Priority Data

Sep. 15, 2015    (EP) .................................... 15185338

(51) Int. Cl.
| | |
|---|---|
| *F03D 80/55* | (2016.01) |
| *F03D 80/60* | (2016.01) |
| *F03D 1/06* | (2006.01) |
| *F03D 7/02* | (2006.01) |
| *F03D 9/25* | (2016.01) |

(Continued)

(52) U.S. Cl.
CPC .............. *F03D 80/55* (2016.05); *F03D 1/06* (2013.01); *F03D 7/0248* (2013.01); *F03D 9/25* (2016.05); *F03D 80/00* (2016.05); *F03D 80/60* (2016.05); *F03D 80/82* (2016.05); *F03D 80/88* (2016.05); *F05B 2220/7066* (2013.01); *F05B 2260/20* (2013.01); *F05B 2260/63* (2013.01); *F05B 2260/64* (2013.01); *F05B 2260/902* (2013.01);

(Continued)

(58) Field of Classification Search
CPC ....................................................... F03D 80/55
See application file for complete search history.

(56) References Cited

U.S. PATENT DOCUMENTS

| | | | | |
|---|---|---|---|---|
| 6,676,122 B1 * | 1/2004 | Wobben | ................... | F03D 80/60 290/55 |
| 7,843,080 B2 * | 11/2010 | Jansen | ..................... | H02K 9/14 290/55 |

(Continued)

FOREIGN PATENT DOCUMENTS

| | | |
|---|---|---|
| CN | 101669411 A | 3/2010 |
| CN | 102691871 A | 9/2012 |

(Continued)

OTHER PUBLICATIONS

European Extended Search Report dated Mar. 17, 2016; Application No. 15185338.9; 5 pgs.

*Primary Examiner* — Igor Kershteyn
*Assistant Examiner* — Juan G Flores
(74) *Attorney, Agent, or Firm* — Schmeiser, Olsen & Watts LLP

(57) ABSTRACT

A wind turbine including a generator with a stator and a rotor, a cooling arrangement, a wind turbine brake including a brake disk and a caliper with brake pads is provided. An air duct with a filter is located near the brake pads of the caliper. During the operation of the cooling arrangement, a part of the air flow is guided via the brake pads. The brake dust produced by the brake pads during operation of the brake will be reduced by the filter of the air duct.

10 Claims, 2 Drawing Sheets

(51) Int. Cl.
*F03D 80/80* (2016.01)
*F03D 80/00* (2016.01)

(52) U.S. Cl.
CPC ........... *Y02E 10/721* (2013.01); *Y02E 10/723* (2013.01); *Y02E 10/725* (2013.01)

(56) References Cited

U.S. PATENT DOCUMENTS

| | | |
|---|---|---|
| 8,961,110 B2 * | 2/2015 | Johansen ................ B03C 3/017 |
| | | 415/121.2 |
| 2010/0118492 A1 | 5/2010 | Larsen |
| 2010/0140952 A1 | 6/2010 | Jansen |
| 2011/0163545 A1 | 7/2011 | Hirai |
| 2012/0156053 A1 | 6/2012 | Stiesdal |
| 2012/0243998 A1 | 9/2012 | Becker |

FOREIGN PATENT DOCUMENTS

| | | |
|---|---|---|
| EP | 2182619 A1 | 5/2010 |
| EP | 2333321 A1 | 6/2011 |
| EP | 2899850 A2 | 7/2015 |
| EP | 2902619 A1 | 8/2015 |

* cited by examiner

WIND TURBINE WITH A BRAKE DUST COLLECTOR

CROSS-REFERENCE TO RELATED APPLICATION

This application claims priority to European Application No. 15185338.9 having a filing date of Sep. 15, 2015 the entire contents of which are hereby incorporated by reference.

FIELD OF TECHNOLOGY

The following relates to a wind turbine and a method to collect brake dust of a wind turbine brake.

BACKGROUND

EP 2 182 619 A shows a wind turbine comprising a stator and a rotor and a cooling arrangement. The cooling arrangement comprises an air cooling and a liquid cooling device which are connected by an air-to-liquid heat exchanger, which is applied to transport heat out of the generator by the cooling liquid.

EP 2 902 619 shows a cooling arrangement for a wind turbine with an outer rotor and an inner stator. A cooling arrangement is realized to guide an air flow over the outside rotor to transfer heat from the generator to the cooling air flow.

EP 2 333 321 A shows a wind turbine with a brake system comprising brake disk in a flexible portion for compensating or absorbing an expansion of the brake system.

A typical braking system of a wind turbine comprises a brake disk, a caliper with brake pads. During braking operation, the caliper presses the brake pads onto the surface of the rotor disk, thus reducing the rotor speed of the wind turbine and producing heat. Additionally, brake dust from the brake pads can be released within the generator.

SUMMARY

An aspect relates to the amount of brake dust released.

A wind turbine comprises a generator with a stator and a rotor for producing electrical power. The generator comprises a cooling arrangement or cooler for generating a cooling air flow to cool at least parts of the generator during operation of the cooling arrangement or cooler. A wind turbine brake is installed to be able to reduce the speed of the wind turbine. The brake comprises a brake disc and at least one brake caliper with at least one brake pad, wherein the at least one brake pad being located within the stream of a part of the cooling air flow during operation of the cooling arrangement or cooler. An air duct is located with its inlet opening at the at least one brake pad so that the part of the cooling air flow streaming over the brake pad will flow through the air duct. The air duct comprises a filter which reduces significantly the amount of brake dust produced by the at least one brake pad during operation of the wind turbine brake and flowing within the stream of a part of the cooling air flow during operation of the cooling arrangement or cooler.

Furthermore, the air duct comprises a valve which enables or disables the air flow through the air duct, wherein the valve is at least open during operation of the wind turbine brake. The valve is preferably closed in non-braking operation to provide more air flow outside the air duct and thus increase the cooling performance.

Furthermore, the cooling arrangement comprises at least one fan which is located preferably at the stator is able to produce the cooling air flow.

Furthermore, the cooling system comprises a heat exchanger resulting in a closed air flow circuit within the wind turbine Alternatively, the cooling arrangement comprises fans drawing the cooling air from the outside of the wind turbine via filters and dehumidifiers into the generator, wherein the cooling arrangement comprises fans drawing the cooling air warmed up by the generator to the outside of the wind turbine.

Furthermore, the dust-collecting-capacity of the filter is at least as high as the volume of the brake-dust being produced/created during the lifetime of the at least one brake pad of the brake caliper. Thus, the filter can be cleaned/changed/replaced simultaneously with the standard maintenance service to replace the at least one brake pad or the brake pads of the respective caliper.

Furthermore, the stream of a part of the cooling air flow is warmed-up by the generator before streaming around the brake pads. Thus, the stator windings are not in the direct airflow path which still may content some brake dust.

Alternatively, the stream of a part of the cooling air flow is not yet warmed-up by the generator before streaming around the brake pads.

Furthermore, the method to collect brake dust of a wind turbine brake comprises the following steps:

The part of the cooling air flow comprising the brake dust created by the at least one brake pad will flow through the air duct and been filtered by the filter of the air duct during operation of the cooling system.

Furthermore, the filter bag comprising the brake dust will be replaced or the filter containing the brake dust will be emptied or the brake dust will be sucked out of the filter by a vacuum cleaner at earliest when the at least one brake pad has to be replaced thus enabling a reduced number of service maintenance events.

Furthermore, the power of the part of the cooling arrangement producing the flow of the part of the cooling air flow (AF, comprising the brake dust will be increased preferably to a maximum value during operation of the wind turbine brake.

Generally, this brake dust "sucking/collecting" system does not require an additional motor or fan, but it makes use of the pressure differences in the generator air cooling system. The system is suitable for both the generators with
  "liquid link" with a heat exchanger and a "closed cooling system" or
  for those with direct cooling with an "open" cooling system.

The brake dust released during the braking operation will be prevented from entering the generator thus increasing the lifetime of parts of the wind turbine.

The proposed solution makes use of the depression in the generator cavity to suck the dust particles released while braking. A tube or a system of tubes should be connected to the brake calipers (high pressure) at one end and to the stator cavity (low pressure) at the other end in order to suck in the dust. In the tube a valve and a filter should be installed. The valve should close the tube during normal turbine operation and it should open it during braking. Any type of filter could be used, and suitable types would be cyclone filter which would not require a filter change or a bag filter which could be sized to collect as much as the brake pads volume.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. The following will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein.

DETAILED DESCRIPTION

Figure 1:
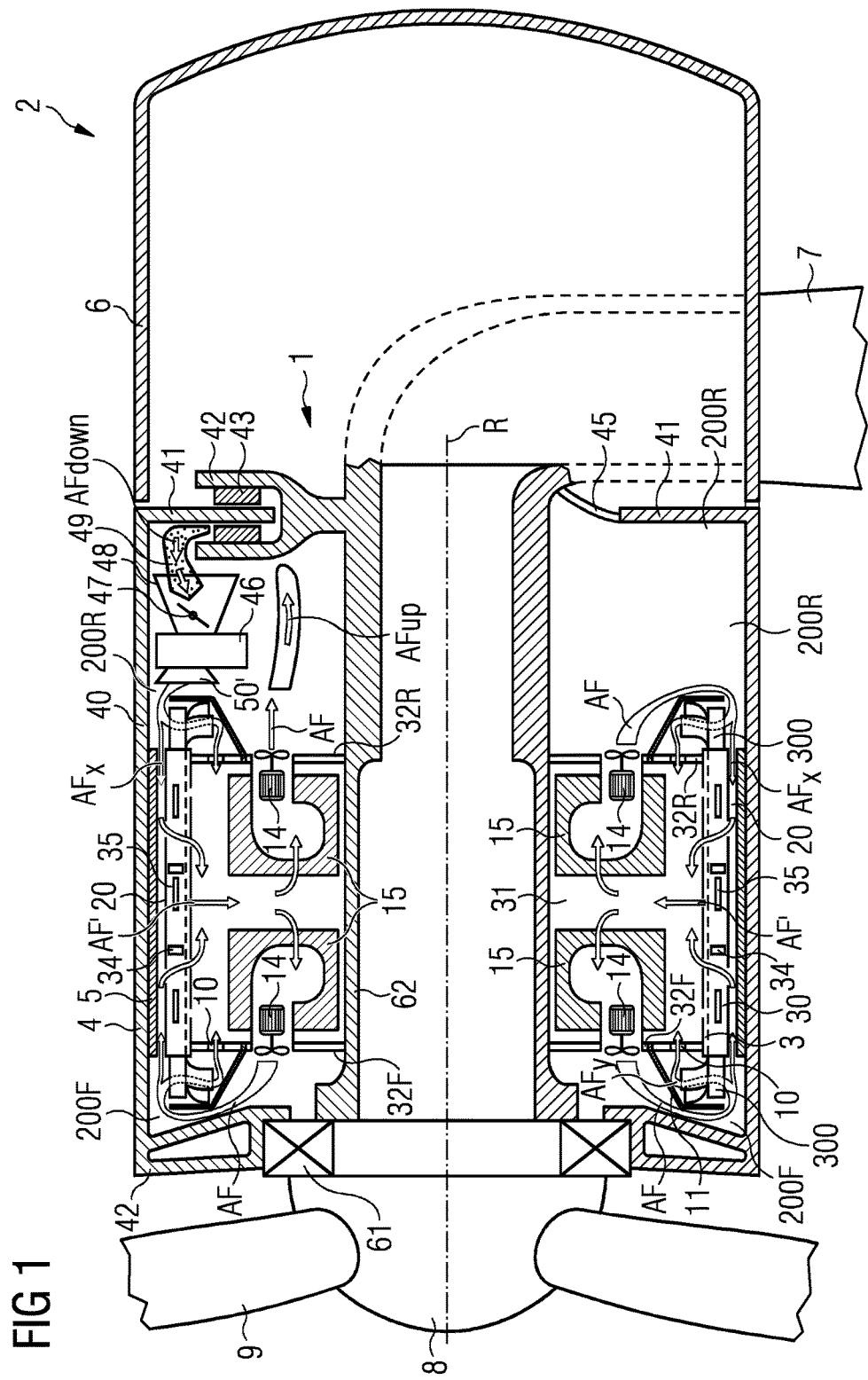
FIG. 1 shows a simplified diagram of a direct-drive wind turbine.

The illustration in the drawing is schematic. It is noted that in different figures, identical elements or features are provided with the same reference signs. In order to avoid unnecessary repetitions elements or features which have already been elucidated with respect to a previously described embodiment are not elucidated again at a later position of the description.

FIG. 1 is a simplified diagram of a direct-drive wind turbine 2. A nacelle 6 is mounted on top of a tower 7. A hub 8 with rotor blades 9 is mounted to a permanent-magnet generator 3, 4 comprising an outer rotor 4 and an inner stator 3 which are connected rotatable to each other by a bearing unit 61. The rotor 4 comprises permanent magnets 5 facing the inner stator 3 circumferentially. In another embodiment (not shown), the magnetic fields of the magnets 5 can also be created electrically.

During operation, the hub 8 with the blades 9 and the outer rotor 4 is caused to rotate about an axis of rotation R. Windings 30 on the inner stator 3 are cooled by guiding a cooling airflow AFx via the end windings 300 into an air-gap 20 between rotor 4 and stator 3 and then drawing the airflow AFx through the stator windings 30 and through radial cooling channels 34 of the stator 3, and into an interior cavity 31 of the stator 3. This interior cavity 31 extends about a main shaft 62 around the axis of rotation R. In this embodiment, the warmed air AF' drawn into the interior cavity 31 is cooled by a number of heat exchangers 15 and then blown out of the interior cavity 31 by a number of fans 14 which direct a cooled airflow AF back into a cavity 200R, 200F at each end of the stator 3. The diagram shows that a winding overhang 300—also called stator end windings 300 which is part of the stator windings 30—extends to some distance into the cavity 200R between rotor housing 40 and brake-disc 41 at the non-drive end of the generator, and into the cavity 200F between rotor housing 40 and a front face 32F at the drive end. At the non-drive end, the cavity 200R is bounded by the cylindrical rotor housing body 40 and a brake disc 41, and is sealed off from the nacelle or canopy 44 by a suitable cover 45 or seal 45. One or several brake calipers 42 are circumferentially distributed and fixed on the non-drive end of the main shaft 62. A brake caliper 42 comprises two brake pads 43 facing each side the brake disc 41. In braking operation, the caliper 42 or the calipers 42 presses the brake pads 43 against the opposing surfaces of the rotating brake disc 41 resulting in transforming rotational energy into heat, thus forming a wind turbine brake 41, 42, 43. The brake disc 41 serves as a braking or stopping means of rotational movements of the rotor 4 when interacting with the respective brake caliper(s) 42 disposed with a structural component of the stator 3 or nacelle 6.

Additionally fine brake dust 49 from abrasion of the brake pads 43 will be distributed into the surrounding air during operation of the wind turbine brake 41, 42, 43.

To ensure that the cooling airflow AF does not simply flow around the barrier-like winding overhang 300, the cooling arrangement 1 comprises an arrangement of bypass openings 10 and manifolds 11. In this exemplary embodiment, the bypass openings 10 are formed on the stator front face 32F and stator rear face 32R. As a cooling airflow AF is directed from the stator interior 31 into the cavity 200R, 200F and in the direction of the air-gap 20, an underpressure inside the stator interior 31 acts to draw a portion AFy of the cooling airflow AF through the narrow spaces in the winding overhang 300. The manifold 11 is arranged to ensure that the warmed air then passes directly into the stator interior 31 through the bypass openings 10. This portion AFy of the cooling airflow AF effectively "bypasses" the air-gap and enters the stator interior 31 by a shorter route. The underpressure in the stator interior cavity 31 can be relative, i.e. as long as the pressure inside the stator interior 31 is lower than the pressure in a cavity 200R, 200F, a portion of the cooling airflow AF will be encouraged to pass through the spaces in the winding overhang 300, since the openings 10 offer a path into the stator interior 31. The pressure differential can be achieved by driving a number of fans 14 to blow the cooled air AF into the cavity 200R, 200F. The relatively small space in the cavity 200F, 200R (reduced even further by the presence of the manifold 11) encourages such a pressure differential.

Axial cooling channels 35 and radial channels 34 (shown schematically) provide a path for a portion AFx of the cooling airflow AF alongside the windings 30 and into the stator interior 31. The cooling airflow portion AFx can enter the air-gap 20 at either end, and can travel along the axial cooling channels 35 and then through the radial channels 34 into the stator interior 31. Temperature measurements for this type of generator are made to determine the location of any winding overhang hotspot 300 and the required number and positions of bypass openings 10, and the dimensions and positions of the manifolds 11.

The caliper(s) 42 with the brake pads 43 are located in the flow path AFup, AFdown which as a part of the cooling air flow AF. In operation of the fan 14 or the fans 14, the upstream air flow AFup streams from the cavity 200R to the brake pads 43. The downstream air flow AFdown streams away from the brake pads 43 to the air gap 20 and the stator 3 and comprises the fine brake dust 49 created by abrasion of the brake pads 43.

An air duct 48, 50 is positioned in the downstream path AFdown in order to collect the air comprising the fine brake dust 48. A dust filter 46 is positioned within the air duct 48, 50 between the inlet part 48 of the air duct 48, 50 and the outlet part 50 of the air duct 48, 50. The filter 46 can be any type of filter, e.g. a cyclone filter or a bag filter.

The air cleaned by the filter 46 will leave the air duct 48, 50 by its outlet 50 and be further distributed to the air-gap 20 via the cooling airflow portion and to the winding over-hang 300 via the cooling airflow portion AFy.

The air duct 48, 50 comprises a valve 47 which can enable or stop the air flow in the air duct 48, 50. Preferably, the valve 47 is positioned in the inlet part 48 of the air duct 48, 50.

Preferably, the valve 47 is open in operation of the/wind turbine brake 41, 42, 43 in order to collect the abrased brake dust 46 in the dust filter 46 and closed in non-braking operation in order to prevent the reduction of the cooling airflow AF created by the downstream air-flow AFdown within the air duct 48, 50.

Preferably, the power of the fans 14 producing the flow of the part of the cooling air flow AFup, AFdown comprising the brake dust 49 will be increased preferably to a maximum value during operation of the wind turbine brake 41, 42, 43.

The valve 47 can be a passive flap valve 47 opening depending on the magnitude of the downstream airflow AFdown or an electrical switchable, active flap valve 47.

The collecting capacity of the filter 46, i.e. volume of the brake dust 49 the filter 46 can collect, e.g. in the filter bag or the collecting unit of the filter cyclone, should be at least as large as the volume of the brake pads 43 of the brake caliper 42. Preferably, the filter bag of the filter 46 will be replaced or the filter cyclone of the filter 46 will be emptied if the brake pads 43 are replaced. This can be done in one maintenance session.

The air duct 48, 50 is positioned at least partly within the cooling air stream flow AF.

Figure 2:
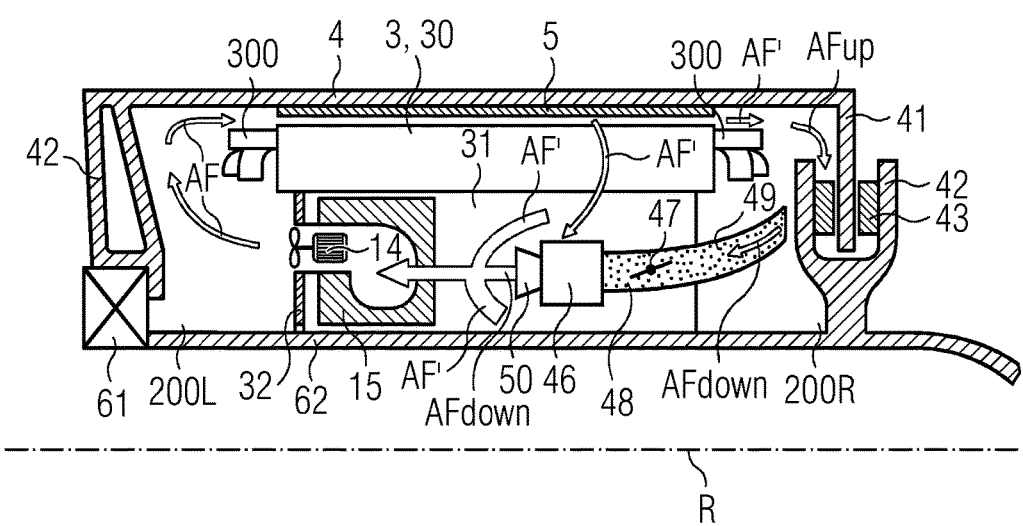
FIG. 2 shows a simplified wind turbine of FIG. 1 with a different cooling airflow.

FIG. 2 shows a simplified wind turbine of FIG. 1 with a different air flow

The permanent-magnet generator 3, 4 comprises an outer rotor 4 and an inner stator 3 which are connected rotatable to each other by a bearing unit 61. The rotor 4 comprises permanent magnets 5 facing the inner stator 3 circumferentially. In another embodiment (not shown), the magnetic fields of the magnets 5 can also be created electrically.

During operation, the outer rotor 4 is caused to rotate about an axis of rotation R. Windings 30 on the inner stator 3 are cooled by guiding a cooling airflow AF via the end windings 300 into an air-gap 20 between rotor 4 and stator 3 and through the stator windings 30, and into an interior cavity 31 of the stator 3. This interior cavity 31 extends about a main shaft 62 around the axis of rotation R. In this embodiment, the warmed air AF' drawn into the interior cavity 31 is cooled by a number of heat exchangers 15 and then blown out of the interior cavity 31 by a number of fans 14 which direct a cooled airflow AF back into a cavity 200L of the stator 3. The diagram shows that a winding overhang 300—also called stator end windings 300 which is part of the stator windings 30—extends to some distance into the cavity 200L between the rotor housing 40 and a front stator face 32 at the drive end.

At the non-drive end, the cavity 200R is bounded by the cylindrical rotor housing body 40 and a brake disc 41, and is sealed off from the nacelle or canopy 44 by a suitable cover 45 or seal 45 (shown in FIG. 1). One or several brake calipers 42 are circumferentially distributed and fixed on the non-drive end of the main shaft 62. A brake caliper 42 comprises two brake pads 43 facing each side the brake disc 41. In braking operation, the caliper 42 or the calipers 42 presses the brake pads 43 against the opposing surfaces of the rotating brake disc 41 resulting in transforming rotational energy into heat, thus forming a wind turbine brake 41, 42, 43.

The caliper(s) 42 with the brake pads 43 are located in the flow path AFup, AFdown as part of the warmed-up cooling air flow AF'. In operation of the fan 14 or the fans 14, the upstream air flow AFup flows to the brake pads 43 from the air gap 20 and the stator 3. The downstream air flow AFdown streams away from the brake pads 43 to the non-drive end cavity 200R and the interior cavity 31 and comprises the fine brake dust 49 created by abrasion of the brake pads 43.

An air duct 48, 50 is positioned in the downstream path AFdown in order to collect the air comprising the fine brake dust 48. A dust filter 46 is positioned within the air duct 48,50 between the inlet part 48 of the air duct 48, 50 and the outlet part 50 of the air duct 48, 50. The filter 46 can be any type of filter, e.g. a cyclone filter or a bag filter.

The air AFdown cleaned by the filter 46 will leave the air duct 48, 50 by its outlet 50 and be further distributed to the non-drive end cavity 200R and interior cavity 31.

The air duct 48, 50 comprises a valve 47 which can enable or stop the air flow in the air duct 48, 50. Preferably, the valve 47 is positioned in the inlet part 48 of the air duct 48, 50.

Preferably, the valve 47 is open in operation of the turbine brake 41, 42, 43 in order to collect the abraded brake dust 46 in the dust filter 46 and closed in non-braking operation in order to prevent the reduction of the cooling airflow AF created by the downstream air-flow AFdown within the air duct 48, 50.

Preferably, the power of the fans 14 producing the flow of the part of the cooling air flow AFup, AFdown comprising the brake dust 49 will be increased preferably to a maximum value during operation of the wind turbine brake 41, 42, 43.

The valve 47 can be a passive flap valve 47 opening depending on the magnitude of the downstream airflow AFdown or an electrical switchable, active flap valve 47.

The collecting capacity of the filter 46, i.e. volume of the brake dust 49 the filter 46 can collect, e.g. in the filter bag or the collecting unit of the filter cyclone, should be at least as large as the volume of the brake pads 43 of the brake caliper 42. Preferably, the filter bag of the filter 46 will be replaced or the filter cyclone of the filter 46 will be emptied if the brake pads 43 are replaced. Alternatively, the brake dust 49 will be sucked out of the filter 46 by a vacuum cleaner. This can be done in one maintenance session.

As alternative, the cooling arrangement with fans can be an "open" system in which the cooling air flow is drawn by from the outside of the wind turbine via filters and dehumidifiers into the generator. The cooling air will be warmed up by the generator and then be drawn by fans to the outside of the wind turbine.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A wind turbine comprising:
   a generator with a stator and a rotor for producing electrical power,
   a cooling arrangement generating a cooling air flow to cool at least parts of the generator during operation of the cooling arrangement, wherein the cooling arrangement comprises a heat exchanger resulting in a closed air flow circuit,
   a wind turbine brake comprising a brake disc and at least one brake caliper with at least one brake pad, wherein a part of the cooling air flow streams over the at least one brake pad,
   an air duct which is located downstream in relation to the at least one brake pad, wherein the air duct collects the brake dust caused by the at least one brake pad during operation of the wind turbine brake,
   wherein the air duct includes a filter,
   wherein the filter significantly reduces the amount of brake dust in the stream of the part of cooling air flow.

2. The wind turbine according to claim 1, wherein the cooling arrangement comprises at least one fan, wherein the at least one fan is able to produce the cooling air flow.

3. The wind turbine according to claim 1, wherein the cooling arrangement comprises at least one fan, which is located at the stator.

4. The wind turbine according to claim 1, wherein the dust-collecting-capacity of the filter is at least as high as the volume of the brake-dust being created by the least one brake pad of the brake caliper.

5. The wind turbine according claim 1, wherein the part of the cooling air flow is heated by the generator.

6. The wind turbine according to claim 1, wherein the part of the cooling air flow is delivered by fans and not yet heated by the generator.

7. A wind turbine comprising:
   a generator with a stator and a rotor for producing electrical power,
   a cooler generating a cooling air flow to cool at least parts of the generator during operation of the cooler,
   a wind turbine brake comprising a brake disc and at least one brake caliper with at least one brake pad, wherein a part of the cooling air flow streams over the at least one brake pad,
   an air duct which is located downstream in relation to the at least one brake pad, wherein the air duct collects the brake dust caused by the at least one brake pad during operation of the wind turbine brake,
   wherein the air duct includes a filter,
   wherein the filter significantly reduces the amount of brake dust in the stream of the part of cooling air flow,
   wherein the air duct comprises a valve which enables or disables the air flow through the air duct, wherein the valve is at least open in operation of the wind turbine brake and preferably closed in non-braking operation.

8. A method to collect brake dust of a wind turbine brake, conducted by a wind turbine, according to claim 1, wherein the part of the cooling air flow having the brake dust created by the at least one brake pad will flow through the air duct and be filtered by the filter of the air duct during operation of the cooling arrangement.

9. The method according to claim 8, wherein a filter bag comprising the brake dust is replaced or emptied, or the brake dust is sucked out of the filter bag by a vacuum cleaner when the at least one brake pad is replaced.

10. The method according to claim 8, wherein the power of fans of the cooling arrangement producing the flow of the part of the cooling air flow comprising the brake dust is increased to a maximum value during operation of the wind turbine brake.

* * * * *